(12) United States Patent
Craig

(10) Patent No.: US 8,648,490 B2
(45) Date of Patent: Feb. 11, 2014

(54) SYSTEM CONFIGURED TO CONTROL AND POWER A VEHICLE OR VESSEL

(71) Applicant: Jason Craig, Fairfax, VA (US)

(72) Inventor: Jason Craig, Fairfax, VA (US)

(73) Assignee: InScope Energy, LLC, Reston, VA (US)

( * ) Notice: Subject to any disclaimer, the term of this patent is extended or adjusted under 35 U.S.C. 154(b) by 0 days.

(21) Appl. No.: 13/859,577

(22) Filed: Apr. 9, 2013

(65) Prior Publication Data

US 2013/0229051 A1    Sep. 5, 2013

Related U.S. Application Data

(63) Continuation of application No. 12/364,430, filed on Feb. 2, 2009, now Pat. No. 8,427,002.

(51) Int. Cl.
*B60L 1/00* (2006.01)
*B60L 3/00* (2006.01)
*H02G 3/00* (2006.01)

(52) U.S. Cl.
USPC ............................................................ 307/9.1

(58) Field of Classification Search
USPC ....... 307/9.1; 60/659, 670; 440/45; 237/12.1, 237/12.3 B
See application file for complete search history.

(56) References Cited

U.S. PATENT DOCUMENTS

| | | | |
|---|---|---|---|
| 4,660,332 A | 4/1987 | Colvin, Jr. .................... | 52/79.5 |
| 5,020,411 A | 6/1991 | Rowan .......................... | 89/1.11 |
| 6,157,527 A | 12/2000 | Spencer et al. ................ | 361/64 |
| 6,252,311 B1 | 6/2001 | West ............................. | 307/29 |
| 6,614,204 B2 | 9/2003 | Pellegrino et al. ............ | 320/109 |
| 6,816,466 B1 | 11/2004 | Daniel ........................... | 370/254 |
| 6,904,385 B1 | 6/2005 | Budike, Jr. .................... | 702/182 |
| 7,188,003 B2 | 3/2007 | Ransom et al. ............... | 700/286 |
| 7,353,653 B2 | 4/2008 | Bronicki ........................ | 60/646 |
| 7,379,791 B2 | 5/2008 | Tamarkin et al. ............. | 700/286 |
| 7,402,978 B2 | 7/2008 | Pryor ............................. | 320/104 |
| 7,428,816 B2 | 9/2008 | Singh et al. .................... | 60/651 |
| 7,719,257 B2 | 5/2010 | Robarge et al. ............... | 324/117 R |
| 8,362,640 B2 | 1/2013 | Craig et al. .................... | 307/29 |
| 8,374,729 B2 | 2/2013 | Chapel et al. ................. | 700/295 |
| 8,427,002 B2 | 4/2013 | Craig ............................. | 307/9.1 |
| 8,437,882 B2 | 5/2013 | Craig et al. .................... | 700/295 |
| 2003/0153216 A1 | 8/2003 | Van-Drentham-Susman . | 440/45 |
| 2004/0001292 A1 | 1/2004 | Vanderkolk .................... | 361/42 |
| 2004/0095237 A1 | 5/2004 | Chen et al. .................... | 340/506 |
| 2004/0174071 A1 | 9/2004 | Nierlich et al. ................ | 307/11 |
| 2005/0008904 A1 | 1/2005 | Suppes ........................... | 429/9 |

(Continued)

FOREIGN PATENT DOCUMENTS

| | | |
|---|---|---|
| WO | WO 2008/113052 | 9/2008 |
| WO | WO 2011/103262 | 8/2011 |

*Primary Examiner* — Carlos Amaya
(74) *Attorney, Agent, or Firm* — Pillsbury Winthrop Shaw Pittman LLP

(57) ABSTRACT

A system configured to power a vehicle or vessel. The system may include an enhanced power control system. The enhanced power control system having a distributed architecture such that power conversion and/or management is provided for individual energy supplies and/or system loads. The distributed architecture of the power control system may enhance the power efficiency of the vehicle or vessel. The distributed architecture of the power control system may enable a plurality of different energy supplies and/or system loads to be incorporated into the power system in a selectable, configurable manner. This may facilitate the addition and/or subtraction of energy supplies and/or system loads from the system to customize the vehicle or vessel for a specific use and/or mission without having to reconfigure the power control system as a whole.

5 Claims, 7 Drawing Sheets

(56) References Cited

U.S. PATENT DOCUMENTS

| | | | |
|---|---|---|---|
| 2005/0084721 A1 | 4/2005 | Ikuma et al. | 429/22 |
| 2005/0252214 A1 | 11/2005 | Goldmeer et al. | 60/698 |
| 2006/0049694 A1 | 3/2006 | Kates | 307/132 E |
| 2006/0052905 A1 | 3/2006 | Pfingsten et al. | 700/286 |
| 2006/0228960 A1 | 10/2006 | Durling | 440/88 |
| 2006/0261213 A1 | 11/2006 | Lavan | 244/30 |
| 2007/0128473 A1 | 6/2007 | Durling et al. | 429/13 |
| 2007/0128478 A1 | 6/2007 | Ballantine et al. | 429/17 |
| 2007/0137686 A1 | 6/2007 | Durling et al. | 136/205 |
| 2008/0019067 A1 | 1/2008 | Reynolds et al. | 361/93.1 |
| 2008/0224892 A1 | 9/2008 | Bogolea et al. | 340/870.3 |
| 2008/0255782 A1 | 10/2008 | Bilac et al. | 702/62 |
| 2009/0106571 A1 | 4/2009 | Low et al. | 713/310 |
| 2009/0144568 A1 | 6/2009 | Fung | 713/300 |
| 2009/0234512 A1 | 9/2009 | Ewing et al. | 700/295 |
| 2010/0030392 A1 | 2/2010 | Ferentz et al. | 700/295 |
| 2010/0102625 A1 | 4/2010 | Karimi et al. | 307/9.1 |
| 2010/0145542 A1 | 6/2010 | Chapel et al. | 700/295 |
| 2010/0225167 A1 | 9/2010 | Stair et al. | 307/29 |
| 2011/0012427 A1 | 1/2011 | Craig et al. | 307/29 |
| 2011/0278921 A1 | 11/2011 | Fretheim et al. | 307/24 |
| 2012/0197453 A1 | 8/2012 | Pugh et al. | 700/293 |
| 2012/0223840 A1 | 9/2012 | Guymon et al. | 340/870.02 |
| 2013/0140885 A1 | 6/2013 | Craig et al. | 307/9.1 |

FIG. 6
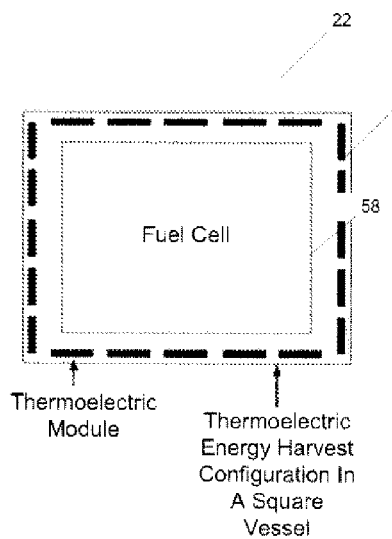
Thermoelectric Module  Thermoelectric Energy Harvest Configuration In A Square Vessel
FIG. 7
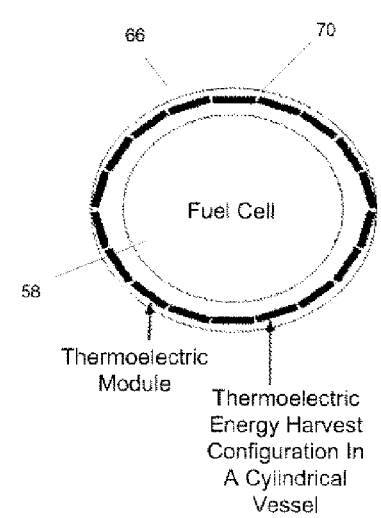
Thermoelectric Module  Thermoelectric Energy Harvest Configuration In A Cylindrical Vessel
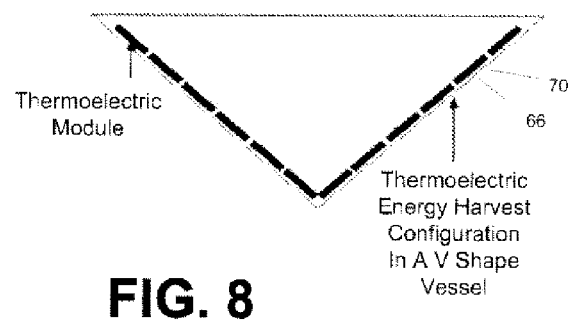
Thermoelectric Module  Thermoelectric Energy Harvest Configuration In A V Shape Vessel
FIG. 8

SYSTEM CONFIGURED TO CONTROL AND POWER A VEHICLE OR VESSEL

RELATED APPLICATION

This application is a continuation of and claims priority benefit under 35 U.S.C. §120 from U.S. patent application Ser. No. 12/364,430, entitled "System Configured To Control And Power A Vehicle Or Vessel", filed Feb. 2, 2009.

FIELD OF THE INVENTION

The invention relates to systems for powering and/or controlling surveillance vehicles and/or vessels. In particular, the invention relates to systems that control a plurality of energy supplies and system loads associated with underwater surveillance vessels.

BACKGROUND OF THE INVENTION

Power systems having a plurality of different energy supplies to power unmanned, underwater vessels and/or vehicles are known. Generally, these hybrid power systems maintain the power sub-systems associated with the separate power sources separate from each other. Each power source is typically used to power different sets of components.

The architecture of these power systems is usually rigid and requires that a predetermined set of energy supplies provide energy in a predictable manner. This architecture generally provides for a centralized control scheme that must be designed for the specific combination of energy supplies to be used.

Similarly, conventional systems may extend this rigid, centralized control and power scheme to system loads. As such, these system may not enable different types of system loads to be accommodated through a common interface for power and control.

SUMMARY

One aspect of the invention relates to a system configured to power a vehicle or vessel. The system may include an enhanced power control system. The enhanced power control system having a distributed architecture such that power conversion and/or management is provided for individual energy supplies and/or system loads. The distributed architecture of the power control system may enhance the power efficiency of the vehicle or vessel. The distributed architecture of the power control system may enable a plurality of different energy supplies and/or system loads to be incorporated into the power system in a selectable, configurable manner. This may facilitate the addition and/or subtraction of energy supplies and/or system loads from the system to customize the vehicle or vessel for a specific use and/or mission without having to reconfigure the power control system as a whole.

In some implementations, the system may include a plurality of system loads (e.g., a sensor configured to detect an environment parameter, a communications device, a propulsion mechanism, a processing device, and/or other components), a plurality of energy supplies (e.g., one or more power generators, one or more energy storage units, and/or other energy supplies), a power bus, a communication bus, a plurality of load management modules, a plurality of supply management modules, a system management processor, and/or other components.

In some implementations, the power bus and the communication bus may operatively couple the system loads, the energy supplies, and/or the system management processor. The power bus may distribute power between the system components. The communication bus may enable communication between the system components.

The system may include separate load management modules for individual ones of the system loads. The load management modules may be operatively disposed in the system between the buses and the corresponding system loads. A given load management module may be configured to manage the distribution of power to the corresponding system load from the power bus and/or the power management of the corresponding system load. The given load management module may be configured to control the corresponding system load. The given load management module may control the corresponding system load in accordance with algorithms and/or instructions received from the system management processor via the communication bus. As such, the given load management module may form an interface between the corresponding system load and the rest of the system.

The load management modules may be configured to facilitate customization for a specific system load. Thus, by customizing an individual load management module and then inserting the customized individual load management module and corresponding system load into the system, various system loads can be added to the system without reconfiguring the rest of system. Similarly, due to the distributed nature of power distribution, power management, and/or system control effected by the load management modules, system loads and their corresponding load management modules can be removed from the system without having to reconfigure other system loads and/or their load management modules.

Conventional systems tend to have more centralized, less customizable control over energy supplies within a system. These systems are generally less flexible in that they are built with predetermined energy supplies included therein, and do not easily accommodate the addition of other types of energy supplies (e.g., as technologies emerge and/or become more accessible). Further, conventional systems may not enable relatively simple customization (e.g., for a particular mission or for other purposes) through the addition and/or removal of supplies.

Power may be distributed to a system load from the power bus through a power stage of a load management module that corresponds to the system load. The power stage may convert power received from power bus to power suitable for use by the system load. For example, the potential of power obtained from the power bus may be too large (or too small) for direct connection with the system load. The power stage may convert other parameters of the received power (e.g., DC to AC or vice versa, and/or other parameters).

The power stage may include one or more sensors that detect operational and/or status information related to the power stage. For example, the one or more sensors may include one or more potential sensors, one or more current sensors, one or more temperature sensors, and/or other sensors. The output signals generated by the sensors may be transmitted to a power controller of the load management module.

A power controller of the given load management module may be configured to control the power stage of the given load management module locally during power conversion. For example, the power controller may control one or more gate switches in the power stage to manipulate the operation of power stage. The control signals may be generated to maintain the power provided to the corresponding system load with specific parameters and/or to maintain the uniformity of the parameters. The control signals may be generated by the power controller may be based in part on readings of the sensors associated with the power stage in a feedback manner. For example, the control signals generated by the power controller may be determined in a feedback manner based on the reading of one or more current sensors, one or more potential sensors, one or more temperature sensors, and/or other sensors. By including separate power stages and power controllers for individual system loads, the system is capable of providing power having relatively high uniformity with relatively low loss (e.g., by virtue of the relative speed of local feedback control implemented by the power controller) to system loads from power bus.

In some instances, the power controller may be configured to manage the parameters of the power provided by the power stage after conversion. In managing the parameters of the power provided by the power stage after conversion, the power controller may take into account the source of the power provided to the power bus, the parameters of the power on the power bus, the acceptable power parameters for the corresponding system load, a mode of operation of the power stage and/or the system load, and/or other factors.

For example, the power controller may determine what the source of the power provided to the power bus is (e.g., fuel cell, battery, solar generator, waste energy harvester, and/or other sources). Different sources may provide power to the power bus with different parameters (e.g., different polarities, potentials, maximum currents, and/or other parameters). The power controller may adjust operation of the power stage in accordance with the individual parameters of power provided by one or more sources.

As was mentioned above, the power controller may change the operation of the power stage between a plurality of modes. For instance, the power controller may switch operation of the power stage from a boost mode to a buck mode. Switching between the boost and buck modes may be based on the source of power available on the power bus, one or more parameters of the power available on the power bus, and/or based on other considerations.

In some implementations, the power controller may control its associated power stage to enhance switching dead-time within the power stage. In order to monitor and/or enhance switching dead-time, the power controller may monitor operation of the power stage via signals generated by the one or more sensors associated with the power stage.

The power controller may monitor one or more parameters of the operation of the power stage for indications of fault and/or failure on the part of the power stage. For example, the power controller may monitor one or more of stability margin, loss, temperature, and/or other parameters. In some instances, the power controller may identify faults based on one or more of the monitored parameters. Upon detecting a fault, the power controller may adjust operation of the power stage. Detected faults may be transmitted by the power controller to a more centralized control (e.g., the system management processor).

In some implementations, the power controller may be configured on a per-mission basis by receiving mission specific control parameters and/or programs. The control parameters and/or programs may be communicated to the power controller, for example, over the communication bus. The mission specific parameters may include, for example, a distance to be traveled, a timing and/or duration of surveillance that should be conducted, what type of data should be gathered (e.g., what parameter(s) should be monitored), control of the territory in which the mission is to be conducted (e.g., hostile or friendly), and/or other parameters.

The inclusion of power stages and power controllers for individual ones of system loads provides individualized power interfaces for the system loads. Each individualized set of power stage and power controller may enable a particular system load to be incorporated into the overall power system without reconfiguration of other system loads and/or the overall power system. Since power stages and power controllers may be designed to facilitate customization to individual system loads, this distributed design may enhance overall customization of the system to various uses and/or missions.

The given load management module may include a load controller. The load controller of the given load management module may be configured to control the corresponding system load. Controlling the corresponding system load may include controlling one or more aspects of the operation of the system load. For example, the load controller may control a mode, a timing, a sensitivity, and/or other aspects of the corresponding system load. The load controller may transmit commands to the system load that dictate the aspects of operation of the system load. The commands may be determined by the load controller based on one or more mission specific parameters, current operation of one or more of the energy supplies, current operation of one or more other system loads, and/or other parameters. In some instances, the commands transmitted from the load controller to the corresponding system load may be determined according to control algorithms and/or instructions executed on the load controller. In some instances, the commands transmitted from the load controller to the corresponding system load may be determined by translating, reformatting, or otherwise processing commands received at the load controller from an external source (e.g., the system management processor).

As should be apparent from the foregoing, the inclusion of load controllers for individual ones of the system loads provides individualized control interfaces between system loads and the rest of the system. Each individualized load controller enables a particular system load to be incorporated into the overall control system of system without reconfiguration of system loads and/or the system as a whole. Since load controllers may be designed to facilitate customization to individual system loads, this distributed control design may enhance overall customization of the system to various uses and/or missions.

The system may include separate supply management modules for individual ones of the energy supplies. The supply management modules may be operatively disposed in the system between the buses and the corresponding energy supplies. A given supply management module may be configured to manage the distribution of power from the corresponding energy supply to the power bus and/or the power management of the corresponding energy supply. The given supply management module may be configured to control the corresponding energy supply and/or the flow of power therefrom. The given supply management module may control the corresponding energy supply in accordance with algorithms and/or instructions received from the system management processor via the communication bus. As such, the given supply management module may form an interface between the corresponding energy supply and the rest of the system.

The supply management modules may be configured to facilitate customization for a specific energy supply. Thus, by customizing an individual supply management module and then inserting the customized individual supply management module and corresponding energy supply into the system, various energy supplies can be added to the system without reconfiguring the rest of system. Similarly, due to the distributed nature of power distribution, power management, and/or system control effected by the supply management modules, energy supplies and their corresponding supply management modules can be removed from the system without having to reconfigure other energy supplies and/or their supply management modules.

Conventional systems tend to have more centralized, less customizable control over energy supplies within a system. These systems are generally less flexible in that they are built with predetermined energy supplies included therein, and do not easily accommodate the addition of other types of energy supplies (e.g., as technologies emerge and/or become more accessible). Further, conventional systems may not enable relatively simple customization (e.g., for a particular mission or for other purposes) through the addition and/or removal of supplies.

Power may be distributed from an energy supply to the power bus through a power stage of a supply management module that corresponds to the energy supply. If the energy supply includes an energy storage unit, power may be distributed to the energy supply to the power bus during energy storage. The power stage may convert power in a manner similar to that described above with respect to the power stage of a load management module. For example, the potential of power other parameters of the power (e.g., DC to AC or vice versa, and/or other parameters) may be converted by the power stage.

The power stage may include one or more sensors that detect operational and/or status information related to the power stage. For example, the one or more sensors may include one or more potential sensors, one or more current sensors, one or more temperature sensors, and/or other sensors. The output signals generated by the sensors may be transmitted to a power controller of the load management module.

A power controller of the given supply management module may be configured to control the power stage of the given load management module locally during power conversion in a manner similar to that described above for the load management module. As was discussed, this may include controlling the power stage in a feedback manner based on the reading of one or more current sensors, one or more potential sensors, one or more temperature sensors, and/or other sensors. By including separate power stages and power controllers for individual energy supplies, the system is capable of providing power having relatively high uniformity with relatively low loss (e.g., by virtue of the relative speed of local feedback control implemented by the power controller) to the power bus from the energy supplies.

In some instances, the power controller may be configured to manage the parameters of the power provided by the power stage after conversion. In managing the parameters of the power provided by the power stage after conversion, the power controller may take into account other energy supplies providing power concurrently to the power bus, the parameters of the power on the power bus, the acceptable power parameters for the system loads drawing power from the power bus, a mode of operation of the power stage and/or the energy supply, and/or other factors.

The power controller may change the operation of the power stage between a plurality of modes. For instance, the power controller may switch operation of the power stage from a boost mode to a buck mode. Switching between the boost and buck modes may be based on the parameters of power to be made available on the power bus and/or based on other considerations.

In some implementations, the power controller may control its associated power stage to enhance switching dead-time within the power stage. In order to monitor and/or enhance switching dead-time, the power controller may monitor operation of the power stage via signals generated by the one or more sensors associated with the power stage.

The power controller may monitor one or more parameters of the operation of the power stage for indications of fault and/or failure on the part of the power stage. For example, the power controller may monitor one or more of stability margin, loss, temperature, and/or other parameters. In some instances, the power controller may identify faults based on one or more of the monitored parameters. Upon detecting a fault, the power controller may adjust operation of the power stage. Detected faults may be transmitted by the power controller to a more centralized control (e.g., the system management processor).

In some implementations, the power controller may be configured on a per-mission basis by receiving mission specific control parameters and/or programs. The control parameters and/or programs may be communicated to the power controller, for example, over the communication bus. The mission specific parameters may include, for example, a distance to be traveled, a timing and/or duration of surveillance that should be conducted, what type of data should be gathered (e.g., what parameter(s) should be monitored), control of the territory in which the mission is to be conducted (e.g., hostile or friendly), and/or other parameters.

The inclusion of power stages and power controllers for individual ones of the energy supplies provides individualized power interfaces for the power supplies. Each individualized set of power stage and power controller may enable a particular energy supply to be incorporated into the overall power system without reconfiguration of other energy supplies, system loads, and/or the overall power system. Since power stages and power controllers may be designed to facilitate customization to individual energy supplies, this distributed design may enhance overall customization of the system to various uses and/or missions.

The given supply management module may include a supply controller. The supply controller of the given supply management module may be configured to control the corresponding energy supply. Controlling the corresponding energy supply may include controlling one or more aspects of the operation of the energy supply. For example, the supply controller may control a mode, a timing, a coupling of the energy supply with the power bus, a powering on or off of the energy supply, and/or other aspects of the corresponding energy supply. The supply controller may transmit commands to the energy supply that dictate the aspects of operation of the system load. The commands may be determined by the supply controller based on one or more mission specific parameters, current operation of one or more other energy supplies, current operation of one or more of the system loads, and/or other parameters. In some instances, the commands transmitted from the supply controller to the corresponding energy supply may be determined according to control algorithms and/or instructions executed on the supply controller. In some instances, the commands transmitted from the supply controller to the corresponding energy supply may be determined by translating, reformatting, or otherwise processing commands received at the supply controller from an external source (e.g., the system management processor).

As should be apparent from the foregoing, the inclusion of supply controllers for individual ones of the energy supplies provides individualized control interfaces between energy supplies and the rest of the system. Each individualized supply controller enables a particular energy load to be incorporated into the overall control system of system without reconfiguration of other energy supplies, system loads, and/or the system as a whole. Since supply controllers may be designed to facilitate customization to individual energy supplies, this distributed control design may enhance overall customization of the system to various uses and/or missions.

The system management processor may provide control algorithms, instructions, and/or commands to the load management modules and the energy supply modules to manage the operation of the system loads and the energy supplies in a coordinated manner. The algorithms, instructions, and/or commands may include overall control algorithms and/or instructions that are provided individually to the load management modules and the energy supply modules to be implemented throughout a mission. The algorithms, instructions, and/or commands may include updated algorithms, instructions, and/or commands that alter ongoing operation in light of changing environmental circumstances (e.g., as detected by one of the system loads, as received by external communication, or otherwise determined), changes in ongoing system operations (e.g., to adjust for a system fault or failure), and/or based on other changes impacting the system.

The system management processor may provide an interface between the system loads and/or the energy supplies. This interface may enable information obtained and/or generated by one system load or energy supply (e.g., environmental information, operational information, communication information, and/or other information) to be communicated to other system loads, other energy supplies, and/or to be communicated to one or more external entities. The interface provided by the system management processor may enable commands, algorithms, and/or instructions to be communicated to one or more of the energy supplies and/or system loads from a user. For example, this type of information may be communicated to the system management processor via a user interface 25, via one or more of system loads 12 that comprise a communications device, and/or otherwise communicated to the system management processor. The system management processor may then transmit the received information to the appropriate ones of system loads and/or energy supplies.

Another aspect of the invention relates to a kinetic energy conversion system. The kinetic energy conversion system may be implemented in an overall system that is configured to power a vehicle or vessel and its associated peripherals. The kinetic energy conversion system may be implemented, for example, in a maritime vessel. In some implementations, the kinetic energy conversion system may include one or more flow paths, one or more impellers, a generator, and/or other components.

The flow path may be configured to guide fluid past the impellers. In some implementations, the fluid may include water in which the vessel carrying the kinetic energy conversion system is at least partially submerged. If the vessel is being driven through the water, the flow path may be oriented such that the water flows through the flow path past the impellers. The flow of water past the impellers may drive the impellers to rotate, which may in turn drive the generation of power by a generator.

In some instances, the flow path may be carried on the vessel such that it can be retracted or closed off from the water. In such instances, the flow path may be retracted or closed off from the water while the kinetic energy conversion system is not being used to generate power.

In some implementations, water flowing through the flow path may not drive the impellers at a constant rate. Coupling the impellers directly to the generator in these implementations may result in damage to the generator and/or reduced efficiency in the power generation of the generator as the rate of rotation of the impellers changes. As such, in some instances, torque converters may be included in the kinetic energy conversion system between the impellers and the generator. The torque converters may provide for relatively constant rotation rate of one or more elements within the generator, thereby enhancing the longevity, efficiency, and/or other aspects of the operation of the generator.

As has been mentioned above, the kinetic energy conversion system may be installed on a maritime vessel. In such a configuration, kinetic energy conversion system may be deployed by opening the flow path to the water through which the vessel is moving. This may result in a flow of water through the flow path. The flow of water may cause the impellers to rotate, thereby enabling the generator to generate power. It should be appreciated that there may be some loss in aerodynamics associated with exposing the flow path to the water through which the vessel is moving. As such, generation of the kinetic energy conversion system in this manner may be somewhat parasitic to the overall vessel. However, the parasitic loss may be small enough and/or the benefits associated with generating power through the kinetic energy conversion system during movement may be sufficient to justify the inefficiencies. Further, at times when the parasitic loss of energy and/or speed becomes greater than can be justified, the flow path may be closed off and/or retracted from the water.

If the vessel including the kinetic energy conversion system is at rest (e.g., anchored at a fixed point underwater), the flow path may be exposed to the water about the vessel. While the vessel is at rest, water may still flow through the flow path due to currents (e.g., tides, flow of rivers or creeks, and/or other currents). In these instances, kinetic energy conversion system may harvest environmental energy.

Another aspect of the invention relates to a waste energy harvesting system. The waste energy harvesting system may be implemented in an overall system that is configured to power a vehicle or vessel and its associated peripherals. For example, the waste energy harvesting system may be implemented in a maritime vessel. In some implementations, the waste energy harvesting system may include a fuel cell, a steam generator, a cold plate, and/or other components.

The fuel cell may operate at a relatively high temperature. The waste energy harvesting system may be configured to harvest waste energy radiated from the fuel cell in the form of heat.

The steam generator may be configured to generate power from a flow of fluid that is vaporized by exposure to the exterior of the fuel cell during operation. The steam generator may include, for example, one or more turbines that are driven by the flow of the fluid therethrough.

The cold plate may be configured to receive vapor that has passed through the steam generator, and to condense the vaporized fluid. As such, the cold plate may form a heat sink in which the received vapor is cooled back to below its critical temperature so that it returns to liquid form. The cold plate may be formed as a body having one or more conduits therein that receive fluid that has passed through the steam generator. In order to facilitate cooling of fluid within the conduits of the cold plate, the cold plate may be in thermal communication with the hull of the vessel carrying the waste energy harvesting system. For example, the body of the cold plate in which the one or more conduits are formed may be in direct contact with the hull of the vessel. In some implementations, the hull of the vessel itself may form the cold plate, and have the conduits formed therein.

In some implementations, the cold plate may be configured to increase the area over which the hull and the cold plate are in contact. For example, the shape of the cold plate may be configured to conform to the shape of the hull of the vessel. This may increase the length of the path that fluid within the cold plate travels in thermal communication with the hull of the vessel and the water in which the vessel is at least partially submerged. As such, the conformance of the shape of the cold plate with the hull of the vessel may increase the effectiveness of the heat sink formed by the cold plate.

Another aspect of the invention relates to an environmental energy harvesting system, in accordance with one or more implementations. The environmental energy harvesting system may be implemented in an overall system that is configured to power an underwater vessel and its associated peripherals. The vessel may be an unmanned, underwater vessel, and may include a main hull. In some implementations, the environmental energy harvesting system may include a sensor module, one or more solar cells, and/or other components.

In some instances, the sensor module may include one or more sensors configured to monitor one or more environmental parameters. The one or more environmental parameters may include a temperature, a current, a wind speed, an electromagnetic radiation intensity, an electromagnetic radiation frequency, radio frequency signals, sonic waves, and/or other environmental parameters.

The sensor module may be buoyant such that it floats on water. During deployment of the sensor module for monitoring the one or more environmental parameters, the main hull may remain submerged under water.

The one or more solar cells may be disposed on the sensor module such that when the sensor module is deployed the one or more solar cells are exposed to electromagnetic radiation from the sun. In response to the exposure to electromagnetic radiation from the sun, the one or more solar cells generate power. Some or all of the power generated from the received electromagnetic radiation may be transmitted to the main hull of the underwater vessel for use in the main power system of the underwater vessel.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 6 illustrates a waste energy harvesting system, according to one or more implementations of the invention.

FIG. 7 illustrates a waste energy harvesting system, according to one or more implementations of the invention.

FIG. 8 illustrates a waste energy harvesting system, according to one or more implementations of the invention.

DETAILED DESCRIPTION

Figure 1:
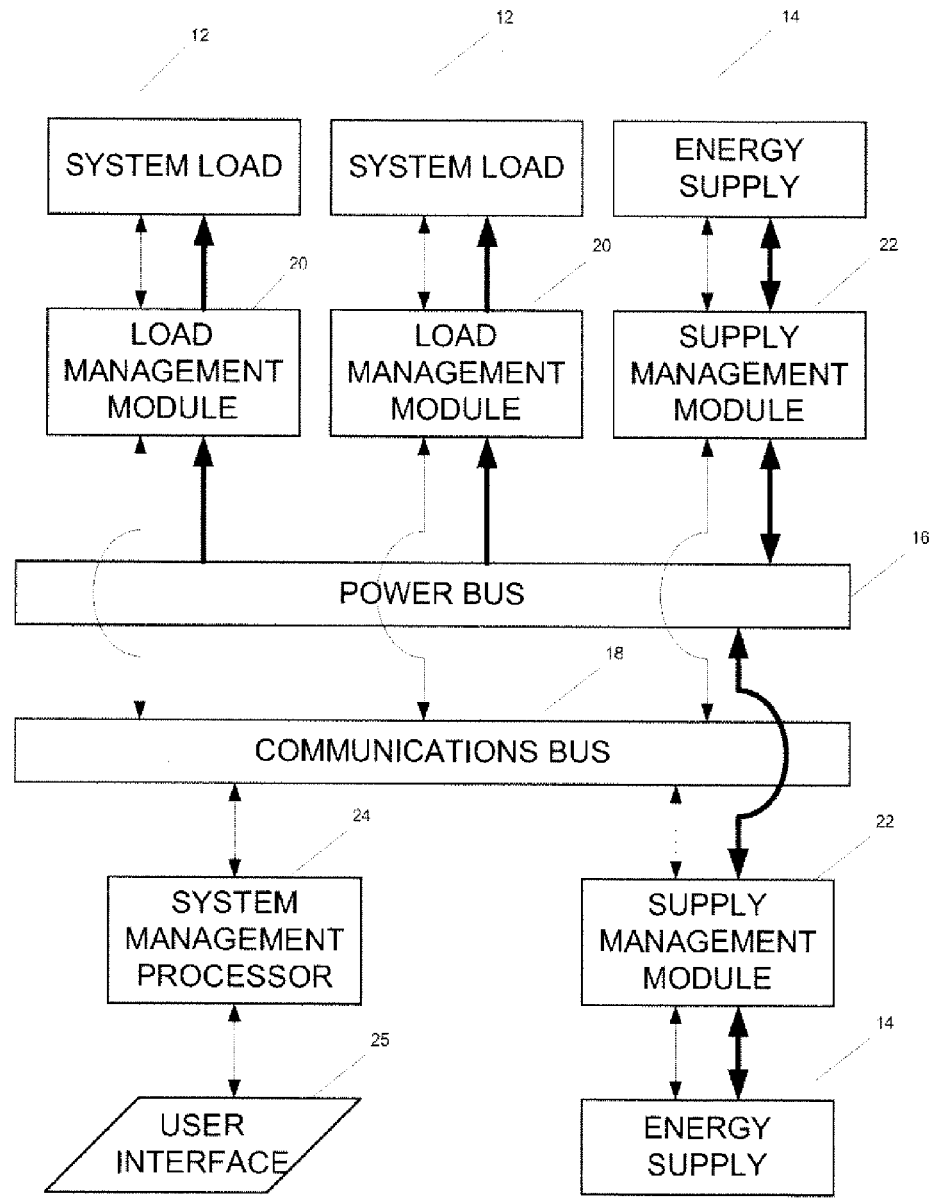
FIG. 1 illustrates a system have a plurality of system loads and energy supplies for power the system, according to one or more implementations of the invention.

FIG. 1 illustrates a system 10 having a plurality of system loads 12 and energy supplies 14 for powering the system, in accordance with one or more implementations. System 10 may include a surveillance system, and/or other systems. The surveillance system may be configured for use in a military and/or research setting. System 10 may include a vehicle or vessel designed to gather information about its surroundings, and/or other vehicles or vessels. For example, system 10 may include a maritime vessel (e.g., a buoy, a boat, an underwater vessel, and/or other vessels). The maritime vessel may be configured for unmanned operation. System 10 may provide an enhanced power control system. The enhanced power control system may enhance the efficiency of system 10, the duty cycle of system 10, the reliability of system 10, and/or other aspects of the operation of system 10. In some implementations, system 10 may include system loads 12, energy supplies 14, a power bus 16, a communication bus 18, a plurality of load management modules 20, a plurality of supply management modules 22, a system management processor 24, and/or other components.

In some implementations, system loads 12 may include system components that are payloads in that they require power to perform their associated functionality. The functionality associated with the different system loads 12 may be varied. For example, system loads 12 may include one or more of a sensor configured to detect an environment parameter, a communications device, a propulsion mechanism, a processing device, and/or other components.

A sensor configured to detect an environment parameter may include a sensor that detects one or more of a temperature (water and/or air), motion, sound waves (audible and/or non-audible), electromagnetic radiation, seismic activity, and/or other parameters. A sensor configured to detect an environment parameter may include a sensor that captures images of its environment. These may include still and/or video images.

A communications device may include a device that enables communication within system 10 and/or with external entities. The information communicated with an external entity by system 10 via a communications device may include system information, information related to detected environmental parameters, system control information, location information, and/or other information. Some non-limiting examples of a communications device may include an antennae, a transmitter, a transponder, a modulator/demodulator, and/or other devices.

A propulsion mechanism may include a mechanism for enabling locomotion of system 10. This may include mechanisms that enable guidance and/or steering of system 10 as well as or instead of just linear motion. In implementations where system 10 includes a maritime vessel, a propulsion mechanism may include, for example, an engine driven propeller, a thruster, an engine driven impeller, and/or other propulsion mechanisms.

A processing device may include a device that processes signals and/or information within system 10. In some instances, one or more of the sensors and/or communications devices may include processing devices (e.g., microprocessors and/or other processing devices). In some instances, a processing device may include a processor or controller that executes the functionality attributed below system management processor.

According to various implementations, energy supplies 14 include system components capable of providing power to system loads 12 (e.g., via power bus 16). These components may include power generators, energy storage units (e.g., a battery), and/or other components.

One or more of energy supplies 14 may include a fuel cell. In some implementations, the fuel cell may include a solid-oxide fuel cell. The fuel cell may provide a primary source of power within system 10. One or more parameters of the fuel cell may be determined based on a vehicle and/or vessel included in system 10, the nature of the functionality of system loads 12, and/or other aspects of system 10. For example, one or more of the type of fuel, the fuel-reforming approach, the catalytic steam reforming, the type of fuel cell, and/or other parameters may be determined based on these aspects of system 10.

One or more of energy supplies 14 may include a waste energy harvester that harvests waste heat generated by one of the other energy supplies 14. For example, as is discussed further below, the waste energy harvester may harvest waste heat generated by a fuel cell to provide an additional source of power within system 10.

One or more of energy supplies 14 may include a parasitic energy generator that generates power during operation one or more of system loads 12. For instance, as is discussed further below, in implementations where system 10 includes a maritime vessel the parasitic energy generator may convert a portion of the kinetic energy of the vessel generated by a system load 12 that includes a propulsion mechanism into power. By way of example, the parasitic energy generator may include one or more impellers that are driven by fluid through which the vessel is moving. Rotation of the impellers by the fluid may provide be implemented by a generator coupled with the impellers to provide power within system 10.

One or more of energy supplies 14 may generate power from energy available in the environment surrounding system 10. For example, one energy supply 14 may include one or more solar cells that convert electromagnetic radiation from the sun to power that is usable within system 10. As another example, one energy supply 14 may include a power generator that converts tidal energy of the ocean into power that is usable within system 10.

As was mentioned above, one or more energy supply 14 may include an energy storage unit, such as one or more batteries, one or more capacitors, or other devices. As a non-limiting example, the energy storage unit may include a lithium-ion battery. An energy storage unit may be used to selectively distribute (e.g., via power bus 16) previously stored power to system loads 12. For instance, if the other energy supplies 14 are not generating power sufficient for the operation of system loads 12, power may be distributed from the energy storage unit to supplement the power being generated. The power stored within the energy storage unit may include power stored prior to the commencement of a mission or task by system 10, and/or may include power derived from the other energy supplies 14 during a mission or task.

In some implementations, power bus 16 includes a power distribution bus that enables power to be distributed between system loads 12 and energy supplies 14. For example, power bus 16 may include a DC power distribution bus or an AC power distribution bus. During operation, power bus 16 may be maintained at an operating potential (e.g., with power supplied by one or more of energy supplies 14). The operating potential may be fixed and/or may be selectively controlled (e.g., by system management processor 24). The operating potential may be determined based on one or more system parameters, such as for example, energy potentials of energy supplies 14, operating potentials of system loads 12, and/or other system parameters. Although a power bus 16 is illustrated above as a single bus, the concepts described with respect to power bus 16 could easily be extended to multiple buses to facilitate system efficiency and/or redundancy.

According to various implementations, communication bus 18 may enable communication between various components of system 10 (e.g., as illustrated in FIG. 1). The information transmitted over communication bus 18 may include mission or task-specific parameters, control information, sensor and/or status outputs, power management information, diagnostic and/or fault information, and/or other information. As is set forth below, in some implementations various high-speed, feedback control may be executed locally on the individual load management modules 20 and/or supply management modules 22. As such, the bandwidth requirements for communication via communication bus 18 may be reduced. In some instances, communication bus 18 may include a bus that is physically connected to a plurality of load management modules 20, supply management module 22, and/or system management processor 24. In some instances, communication bus 18 may include components that enable wireless communication between at least some of load management modules 20, supply management modules 22, and/or system management processor 24. Although a communications bus 18 is illustrated above as a single bus, the concepts described with respect to communications bus 18 could easily be extended to multiple buses to facilitate system efficiency and/or redundancy.

Load management modules 20 may be configured to manage the distribution of power to individual ones of system loads 12 and/or power management of individual ones of system loads 12. The power distributed to system loads 12 by load management modules 20 may be obtained from power bus 16. Load management modules 20 may be configured to control individual ones of system loads 12. The load management modules 20 may control system loads 12 in accordance with algorithms and/or instructions received from system management processor 24. As such, load management modules 20 form an interface between individual system loads 12 and the rest of system 10 that enables various system loads 12 to be added or removed from system 10 without reconfiguring the rest of system 10. The distributed nature of power distribution, power management, and/or system control effected by load management modules 20 may enhance system 10 over conventional systems.

For example, conventional systems tend to have more centralized control over the distribution of power and/or the management of power within a system. These systems are generally less flexible in that they are built with certain types of components in mind, and do not easily accommodate other components. Further, conventional systems may not enable relatively simple customization (e.g., for a particular mission or for other purposes) through the addition and/or removal of loads.

Supply management modules 22 may be configured to manage the distribution of power generated and/or stored by energy supplies 14 to system 10. Supply management modules 22 may be configured to control the power management of individual ones of system supplies 14. Supply management modules 22 may be configured to control individual ones of energy supplies 14. The supply management modules 22 may control energy supplies 14 in accordance with algorithms and/or instructions received from system management processor 24. Similar to the functionality of load management modules 20 with respect to system loads 12, supply management modules 22 form an interface between individual energy supplies 14 and the rest of system 10 that enables various energy supplies 14 to be added or removed from system 10 without reconfiguring the rest of system 10. The distributed nature of power distribution control, power management, and/or system control effected by supply management modules 22 may enhance system 10 over conventional systems.

For example, conventional systems tend to have more centralized, less customizable control over energy supplies within a system. These systems are generally less flexible in that they are built with predetermined energy supplies included therein, and do not easily accommodate the addition of other types of energy supplies (e.g., as technologies emerge and/or become more accessible). Further, conventional systems may not enable relatively simple customization (e.g., for a particular mission or for other purposes) through the addition and/or removal of supplies.

System management processor 24 may include one or more of a digital processor, an analog processor, a digital circuit designed to process information, an analog circuit designed to process information, a state machine, and/or other mechanisms for electronically processing information. System management processor 24 may be configured to provide system-level, over system loads 12 and energy supplies 14. The system-level control provided by system management processor 24 may enable coordinated control over system loads 12 and/or energy supplies 14 in accordance with predetermined objectives, algorithms, and/or instructions. As such, system management processor 24 may be operatively linked to load management modules 20 and supply management modules 22 (e.g., via communication bus 18).

System management processor 24 may provide control algorithms, instructions, and/or commands to load management modules 20 to manage the operation of system loads 12 in a coordinated manner. The algorithms, instructions, and/or commands may include overall control algorithms and/or instructions that are provided individually to load management modules 20 to be implemented by load management modules 20 throughout a mission. The algorithms, instructions, and/or commands may include updated algorithms, instructions, and/or commands that alter ongoing operation of load management modules 20 in light of changing environmental circumstances (e.g., as detected by one or system loads 12, as received by external communication, or otherwise determined), changes in ongoing system operations (e.g., to adjust for a system fault or failure), and/or based on other changes impacting system 10.

System management processor 24 may provide control algorithms, instructions, and/or commands to supply management modules 22 to manage the operation of energy supplies 14 in a coordinated manner. The algorithms, instructions, and/or commands may include overall control algorithms and/or instructions that are provided individually to supply management modules 22 to be implemented by supply management modules 22 throughout a mission. For example, system management processor 24 may manage supply management modules 22 such that energy is provided to power bus 16 by energy supplies 14 in an efficient and coordinated manner. This may include ensuring that power bus 16 is maintained at a predetermined potential, managing the amount of power that is lost by energy supplies 14, coordinating which ones of energy supplies 14 are providing power to power bus 16 at a given time, and/or other control functions. The algorithms, instructions, and/or commands may include updated algorithms, instructions, and/or commands that alter ongoing operation of load management modules 20 in light of changing environmental circumstances (e.g., as detected by one or system loads 12, as received by external communication, or otherwise determined), changes in ongoing system operations (e.g., to adjust for a system fault or failure), and/or based on other changes impacting system 10.

System management processor 24 may provide an interface between system loads 12 and/or energy supplies 14. This interface may enable information obtained and/or generated by one system load 12 (e.g., environmental information, operational information, communication information, and/or other information) to be communicated to other system loads 12, load management modules 20, supply management module 22, energy supplies 14, and/or to be communicated to one or more external entities. The interface provided by system management processor 24 may enable commands, algorithms, and/or instructions to be communicated to one or more of load management modules 20 and/or supply management modules 22 from a user. For example, this type of information may be communicated to system management processor 24 via a user interface 25, via one or more of system loads 12 that comprise a communications device, and/or otherwise communicated to system management processor 24. System management processor 24 may then transmit the received information to the appropriate ones of load management modules 20 and/or supply management modules 22.

User interface 25 is configured to provide an interface between system 10 and one or more users through which the user(s) may provide information to and receive information from system management processor 24. This may enable data, results, and/or instructions and any other communicable items, collectively referred to as "information," to be communicated between the users(s) and one or more of system loads 12, energy supplies 14, load management modules 20, supply management modules 22, system management processor 24, and/or other components of system 10. Examples of interface devices suitable for inclusion in user interface 25 include a keypad, buttons, switches, a keyboard, knobs, levers, a display screen, a touch screen, speakers, a microphone, an indicator light, an audible alarm, and a printer.

It is to be understood that other communication techniques, either hard-wired or wireless, are also contemplated by the present invention as user interface 25. The mechanisms for effecting such communication may be provided by one or more of system loads 12. For example, the present invention contemplates that user interface 25 may be integrated with a removable storage interface. In this example, information may be loaded into system 10 from removable storage (e.g., a smart card, a flash drive, a removable disk, etc) that enables the user(s) to customize the implementation of system 10. Other exemplary input devices and techniques adapted for use with system 10 as user interface 25 include, but are not limited to, an RS-232 port, RF link, an IR link, other wireless link(s), modem (telephone, cable or other), and/or other communications links. In short, any technique for communicating information with system management processor 24 is contemplated by the present invention as user interface 25.

Figure 2:
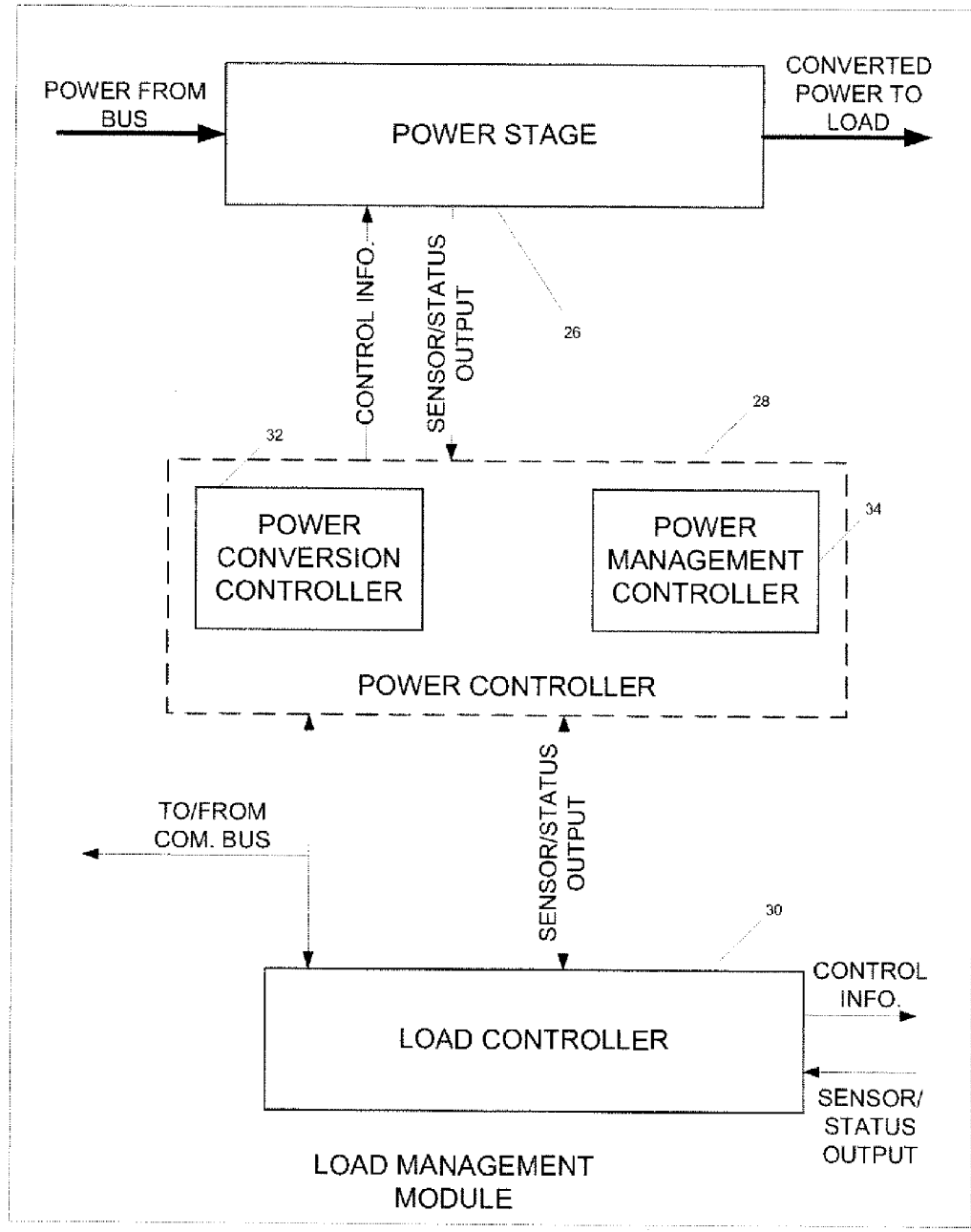
FIG. 2 illustrates a load management module, in accordance with one or more implementations of the invention.

FIG. 2 illustrates one of load management modules 20, in accordance with one or more implementations. In the implementations illustrated in FIG. 2, load management module 20 may include one or more of a power stage 26, a power controller 28, a load controller 30, and/or other components.

Power stage 26 may be coupled to power bus 16 and a system load 12 corresponding to load management module 20. Power may be distributed to system load 12 from power bus 16 through power stage 26. Power stage 26 may convert power received from power bus 16 to power suitable for use by system load 12. For example, the potential of power bus 16 may be too large for direct connection with system load 12. In some instances power stage 26 may convert power received from power bus 16 to power suitable for use by one or more sensors that detect operational parameters and/or status of system load 12, and/or to power suitable for use by power controller 28. For example, power stage 26 may convert power received from power bus 16 to power at one or more lower potentials (e.g., potential(s) for sensors, potential for system load 12, and/or other potentials). Power stage 26 may convert other parameters of the received power (e.g., DC to AC or vice versa, and/or other parameters).

Although not shown as separate elements in FIG. 2, power stage 26 may include one or more sensors that detect operational and/or status information related to power stage 26. For example, the one or more sensors may include one or more potential sensors, one or more current sensors, one or more temperature sensors, and/or other sensors. The output signals generated by the sensors may be transmitted to power controller 28, as shown in FIG. 2.

Power controller 28 may be configured to control power stage 26 during power conversion. In some implementations, power controller 28 may include one or more processors having processing and/or control capabilities. For example, power controller 28 may include a digital processor, an analog processor, a digital circuit designed to process information, an analog circuit designed to process information, a state machine, and/or other mechanisms for electronically processing information. In some implementations, power controller 28 includes a Field Programmable Gate Array ("FPGA") designed to perform some or all of the functionality attributed to power controller 28 below. In some implementations, power controller 28 is configured by software instructions and/or algorithms, firmware, hardware, and/or some combination of software, firmware, and/or hardware to perform the functionality described below. Although power controller 28 is illustrated in FIG. 2 as a single entity, it should be appreciated that power controller 28 may be implemented in a plurality of chips, processors, and/or circuits that are located together or apart from one another. In some implementations, power controller 28 may include a power conversion controller 32, a power management controller 34, and/or other components.

Power conversion controller 32 may be configured to control parameters of power stage 26 during power conversion. For example, power conversion controller 32 may control one or more gate switches in power stage 26 to manipulate the operation of power stage 26. During operation, power conversion controller 32 may control power stage 26 through the generation of control signals transmitted to the gates of power stage 26. The control signals may be generated to maintain the power provided to the corresponding system load 12 with specific parameters and/or to maintain the uniformity of the parameters. The control signals may be generated by power conversion controller 32 based in part on readings of the sensors included in power stage 26 in a feedback manner. For example, the control signals generated by power conversion controller 32 may be determined in a feedback manner based on the reading of one or more current sensors, one or more potential sensors, one or more temperature sensors, and/or other sensors. The feedback control of power stage 26 by power conversion controller 32 may ensure the uniformity of power converted by power stage 26. By including separate power stages 26 and power conversion controllers 32 for individual system load 12, system 10 is capable of providing power having relatively high uniformity (e.g., by virtue of the local feedback control implemented by power conversion controller 32) to system loads 12 from power bus 16.

Power management controller 34 may be configured to control power conversion controller 32 to manage the parameters of the power provided by power stage 26 after conversion. In managing the parameters of the power provided by power stage 26 after conversion, power management controller 34 may take into account the source of the power provided to power bus 16, the parameters of the power on power bus 16, the acceptable power parameters for system load 12, a mode of operation of power stage 26 and/or system load 12, and/or other factors.

For example, power management controller 34 may determine what the source of the power provided to power bus 16 is (e.g., fuel cell, battery, solar generator, waste energy harvester, and/or other sources). Different sources may provide power to power bus 16 with different parameters (e.g., different polarities, potentials, maximum currents, and/or other parameters). Power management controller 34 may adjust operation of power conversion controller 32 in accordance with the individual parameters of power provided by one or more sources.

As was mentioned above, power management controller 34 may change the operation of power conversion controller 32 and/or power stage 26 between a plurality of modes. For instance, power management controller 34 may switch operation of power conversion controller 32 and power stage 26 from a boost mode to a buck mode. Switching between the boost and buck modes may be based on the source of power available on power bus 16.

In some implementations, power management controller 34 may control power conversion controller 32 to enhance switching dead-time within power stage 26. In order to monitor and/or enhance switching dead-time, power management controller 34 may monitor operation of power stage 26 by power conversion controller 32 via signals generated by one or more sensors. For example, the sensors may include the sensors discussed above with respect to power stage 26.

According to various implementations, power management controller 34 may monitor one or more parameters of the operation of power stage 26 by power conversion controller 32. For example, power management controller 34 may monitor one or more of stability margin, loss, temperature, and/or other parameters. In some instances, power management controller 34 may identify faults based on one or more of the monitored parameters. Upon detecting a fault, power management controller 34 may adjust operation of power conversion controller 32 and/or power stage 26. Detected faults may be transmitted by power management controller 34 to a more centralized control (e.g., system management processor 24, shown in FIG. 1).

In some implementations, power management controller 34 may be configured on a per-mission basis by receiving mission specific control parameters and/or programs. The control parameters and/or programs may be communicated to power management controller 34, for example, over communication bus 18. The mission specific parameters may include, for example, a distance to be traveled, a timing and/or duration of surveillance that should be conducted, what type of data should be gathered (e.g., what parameter(s) should be monitored), control of the territory in which the mission is to be conducted (e.g., hostile or friendly), and/or other parameters.

The inclusion of power stages 26 and power controllers 28 for individual ones of system loads 12 provides individualized power interfaces for system loads 12. Each individualized set of power stage 26 and power controller 28 enables a particular system load 12 to be incorporated into the overall power system of system 10 without reconfiguration of system loads 12 and/or system 10. Since power stages 26 and power controllers 28 may be designed to facilitate customization to individual system load 12, this distributed design may enhance overall customization of system 10 to various uses and/or missions.

Load controller 30 may be configured to control the corresponding system load 12. Controlling the corresponding system load 12 may include controlling one or more aspects of the operation of system load 12. For example, load controller 30 may control a mode, a timing, a sensitivity, and/or other aspects of the corresponding system load 12. Load controller 30 may transmit commands to system load 12 that dictate the aspects of operation of system load 12. The commands may be determined by load controller 30 based on one or more mission specific parameters, current operation of one or more of energy supplies 14, current operation of one or more other system loads 12, and/or other parameters. In some instances, the commands transmitted from load controller 30 to system load 12 may be determined according to control algorithms and/or instructions executed on load controller 30. In some instances, the commands transmitted from load controller 30 to system load 12 may be determined by translating, reformatting, or otherwise processing commands received at load controller from an external source (e.g., system management processor 24 shown in FIG. 1).

By way of non-limiting example, if system load 12 includes a sensor that detects an environmental parameter, load controller 30 may transmit commands to the sensor that control a sensitivity of the sensor, turn the sensor on and/or off, control a directivity of the sensor, and/or control other aspects of the operation of the sensor.

As another non-limiting example, if system load 12 includes a communications device, load controller 30 may transmit commands to the device that control a frequency, a modulation mode, a power level, a directivity, a sensitivity, and/or other aspects of the operation of the device.

As yet another non-limiting example, if system load 12 includes a propulsion mechanism, load controller 30 may transmit commands to the propulsion mechanism that control a power level, a speed, a direction of propulsion, an efficiency, and/or other aspects of operation of the propulsion mechanism.

In some instances, system load 12 may include one or more sensors that detect information related to the status and/or operation of system load 12. In such instances, some or all of this information may be communicated to load management module 20 (as shown in FIG. 2). Load management module 20 may implement received information in determining and/or generating commands for controlling system load 12. Load management module 20 may transmit the received information to system management processor 24. System management processor 24 may implement this information to update instructions for load management module 20 and/or other load management modules 20 or supply management modules 22.

As should be apparent from the foregoing, the inclusion of load controllers 30 for individual ones of the system loads 12 provides individualized control interfaces between system loads 12 and the rest of system 10. Each individualized load controller 30 enables a particular system load 12 to be incorporated into the overall control system of system 10 without reconfiguration of system loads 12 and/or system 10. Since power load controllers 30 may be designed to facilitate customization to individual system loads 12, this distributed control design may enhance overall customization of system 10 to various uses and/or missions.

Figure 3:
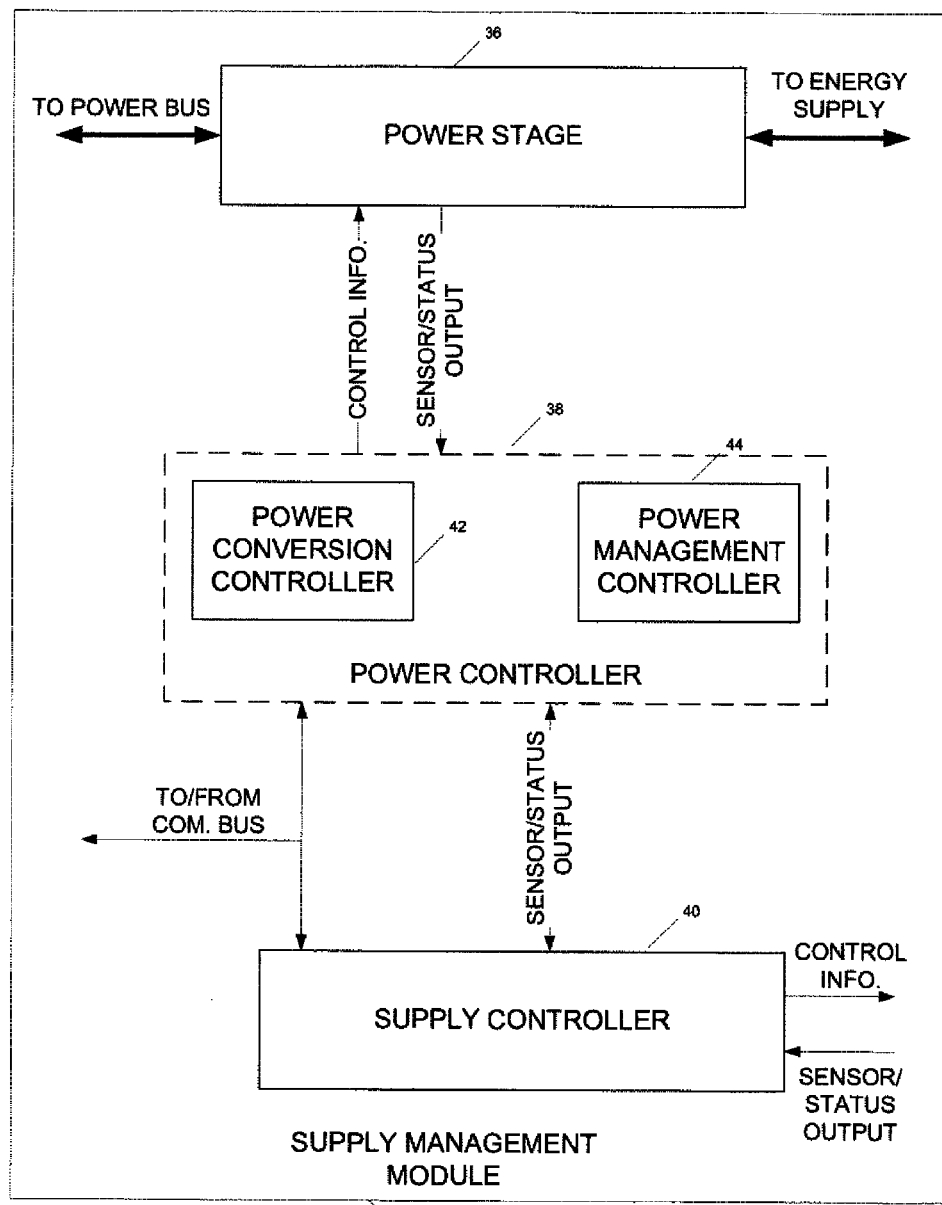
FIG. 3 illustrates a supply management module, in accordance with one or more implementations of the invention.

FIG. 3 illustrates one of supply management modules 22, in accordance with one or more implementations. In the implementations illustrated in FIG. 3, supply management modules 22 may include one or more of a power stage 36, a power controller 38, a supply controller 40, and/or other components.

Power stage 36 may be coupled to power bus 16 and an energy supply 14 corresponding to supply management module 22. Power may be distributed to power bus 16 from the corresponding energy supply 14 through power stage 36. Power stage 36 may convert power received from energy supply 14 to power suitable for distribution over power bus 16. For example, the potential of power supplied by energy supply 14 may be different than the potential of power provided to system loads 12 over power bus 16. Power stage 36 may convert other parameters of the received power (e.g., DC to AC or vice versa, and/or other parameters).

Although not shown as separate elements in FIG. 3, power stage 36 may include one or more sensors that detect operational and/or status information related to power stage 36. For example, the one or more sensors may include one or more potential sensors, one or more current sensors, one or more temperature sensors, and/or other sensors. The output signals generated by the sensors may be transmitted to power controller 38, as shown in FIG. 3.

Similar to the function of power controller 28 with respect to power stage 26, power controller 38 may be configured to control power stage 36 during power conversion. In some implementations, power controller 38 may include one or more processors having processing and/or control capabilities. For example, power controller 38 may include a digital processor, an analog processor, a digital circuit designed to process information, an analog circuit designed to process information, a state machine, and/or other mechanisms for electronically processing information. In some implementations, power controller 38 includes a Field Programmable Gate Array ("FPGA") designed to perform some or all of the functionality attributed to power controller 38 below. In some implementations, power controller 38 is configured by software instructions and/or algorithms, firmware, hardware, and/or some combination of software, firmware, and/or hardware to perform the functionality described below. Although power controller 38 is illustrated in FIG. 3 as a single entity, it should be appreciated that power controller 38 may be implemented in a plurality of chips, processors, and/or circuits that are located together or apart from one another. In some implementations, power controller 38 may include a power conversion controller 42, a power management controller 44, and/or other components.

Power conversion controller 42 may be configured to control parameters of power stage 36 during power conversion. For example, power conversion controller 42 may control one or more gate switches in power stage 36 to manipulate the operation of power stage 36. During operation, power conversion controller 42 may control power stage 36 through the generation of control signals transmitted to the gates of power stage 36. The control signals may be generated to maintain the power provided to power bus 16 with specific parameters and/or to maintain the uniformity of the parameters. The control signals may be generated by power conversion controller 42 based in part on readings of the sensors included in power stage 36 in a feedback manner. For example, the control signals generated by power conversion controller 42 may be determined in a feedback manner based on the reading of one or more current sensors, one or more potential sensors, one or more temperature sensors, and/or other sensors. The feedback control of power stage 36 by power conversion controller 42 may ensure the uniformity of power converted by power stage 36. By including separate power stages 36 and power conversion controllers 42 for individual energy supplies 14, system 10 is capable of providing power having relatively high uniformity (e.g., by virtue of the local feedback control implemented by power conversion controller 30) to power bus 16 from energy supplies 14.

Power management controller 44 may be configured to control power conversion controller 42 to manage the parameters of the power provided by power stage 36 after conversion. In managing the parameters of the power provided by power stage 36 after conversion, power management controller 44 may take into account the parameters of the power on power bus 16, other ones of energy supplies 14 that are simultaneously providing power to power bus 16, the power parameters of power provided by energy supply 14, a mode of operation of power stage 36 and/or energy supply 14, and/or other factors.

For example, power management controller 44 may determine other ones of energy supplies 14 concurrently providing power to power bus 16 is (e.g., fuel cell, battery, solar generator, waste energy harvester, and/or other sources). These different energy supplies 14 may provide power to power bus 16 with parameters different from the parameters generated by the corresponding energy supply 14 (e.g., different polarities, potentials, maximum currents, and/or other parameters). Power management controller 44 may adjust operation of power conversion controller 42 to ensure that the provision of power to power bus 16 by the corresponding energy supply 14 is coordinated with the other ones of energy supplies 14 to reduce loss and/or system faults or damage.

As was mentioned above, power management controller 44 may change the operation of power conversion controller 42 and/or power stage 36 between a plurality of modes. For instance, power management controller 44 may switch operation of power conversion controller 42 and power stage 36 from a boost mode to a buck mode. Switching between the boost and buck modes may be based on the other ones of energy supplies 14 concurrently providing power to power bus 16. As another example, power management controller 44 may change operation of power conversion controller 42 and/or power stage 36 to a low power mode if the corresponding energy supply 14 is not currently producing power, and/or of the corresponding energy supply 14 is not currently providing power to power bus 16.

In some implementations, power management controller 44 may control power conversion controller 42 to enhance switching dead-time within power stage 36. In order to monitor and/or enhance switching dead-time, power management controller 44 may monitor operation of power stage 36 by power conversion controller 42 via signals generated by one or more sensors. For example, the sensors may include the sensors discussed above with respect to power stage 36.

According to various implementations, power management controller 44 may monitor one or more parameters of the operation of power stage 36 by power conversion controller 42. For example, power management controller 44 may monitor one or more of stability margin, loss, temperature, and/or other parameters of power stage 36. In some instances, power management controller 44 may identify faults based on one or more of the monitored parameters. Upon detecting a fault, power management controller 44 may adjust operation of power conversion controller 42 and/or power stage 36. Detected faults may be transmitted by power management controller 44 to a more centralized control (e.g., system management processor 24, shown in FIG. 1).

In some implementations, power management controller 44 may be configured on a per-mission basis by receiving mission specific control parameters and/or programs. The control parameters and/or programs may be communicated to power management controller 44, for example, over communication bus 18. The mission specific parameters may include, for example, a distance to be traveled, a timing and/or duration of surveillance that should be conducted, what type of data should be gathered (e.g., what parameter(s) should be monitored), control of the territory in which the mission is to be conducted (e.g., hostile or friendly), and/or other parameters.

As was mentioned above, in some instances, energy supplies 14 may include an energy storage unit. In addition to managing the distribution of power from the energy storage unit to power bus 16, the supply management module 22 corresponding to the energy storage unit may manage the distribution of power from power bus 16 to the energy storage unit for storage. As such, during power storage, power stage 36 and power controller 38 will perform functions similar to those described above for power stage 26 and power controller 28 with respect to the distribution of power from power bus 16 to system loads 12.

The inclusion of power stages 36 and power controllers 38 for individual ones of energy supplies 14 provides individualized power interfaces for energy supplies 14. Each individualized set of power stage 36 and power controller 38 enables a particular energy supply 14 to be incorporated into the overall power system of system 10 without reconfiguration of energy supplies 14 and/or system 10. Since power stages 36 and power controllers 38 may be designed to facilitate customization to individual energy supplies 14, this distributed design may enhance overall customization of system 10 to various uses and/or missions.

Supply controller 40 may be configured to control the corresponding energy supply 14. Controlling the corresponding energy supply 14 may include controlling one or more aspects of the operation of energy supply 14. For example, supply controller 40 may control a mode, a timing, a sensitivity, powering energy supply 14 off and/or on, and/or other aspects of the corresponding energy supply 14. Supply controller 40 may transmit commands to energy supply 14 that dictate the aspects of operation of energy supply 14. The commands may be determined by supply controller 40 based on one or more mission specific parameters, current operation of other ones of energy supplies 14, current operation of one or more system loads 12, and/or other parameters. In some instances, the commands transmitted from supply controller 40 to energy supply 14 may be determined according to control algorithms and/or instructions executed on load controller 30. In some instances, the commands transmitted from supply controller 40 to energy supply 14 may be determined by translating, reformatting, or otherwise processing commands received at supply controller 40 from an external source (e.g., system management processor 24 shown in FIG. 1).

By way of non-limiting example, if energy supply 14 includes a fuel cell, supply controller 40 may transmit commands to the fuel cell that turn the fuel cell on and/or off, control a reformation sub-system, a cooling system, and/or other sub-systems associated with the fuel cell, and/or control other aspects of the operation of the sensor.

As another non-limiting example, if energy supply 14 includes a waste energy harvester, supply controller 40 may transmit commands to the waste energy harvester that turn the waste energy harvester on and off, control a mode of the waste energy harvester, and/or control other aspects of the operation of the waste energy harvester.

As yet another non-limiting example, if energy supply 14 includes a parasitic power generator, supply controller 40 may transmit commands to the parasitic power generator that activate and/or deactivate the parasitic power generator, control a mode of the parasitic power generator, and/or control other aspects of the operation of the parasitic power generator.

As yet another non-limiting example, if energy supply 14 includes an environmental energy harvester, supply controller 40 may transmit commands to the environmental energy harvester that activate and/or deactivate power generation, control a mode of the environmental energy harvester, and/or control other aspects of the operation of the environmental energy harvester.

As still another non-limiting example, if energy supply 14 includes an energy storage unit, supply controller 40 may transmit commands to the energy storage unit that result in the storage of power in the energy storage unit from power bus 16, result in the distribution of power from the energy storage unit to power bus 16, disconnect the energy storage unit from power bus 16, and/or control other aspects of the operation of the energy storage unit.

In some instances, energy supply 14 may include one or more sensors that detect information related to the status and/or operation of energy supply 14. In such instances, some or all of this information may be communicated to supply management module 22 (as shown in FIG. 3). Supply controller 40 may implement received information in determining and/or generating commands for controlling energy supply 14. Supply controller 40 may transmit the received information to system management processor 24. System management processor 24 may implement this information to update instructions for supply management module 22 and/or other supply management modules 22 or load management modules 20.

As should be apparent from the foregoing, the inclusion of supply controller 40 for individual ones of the system loads 12 provides individualized control interfaces between energy supply 14 and the rest of system 10. Each individualized supply controller 40 enables a particular energy supply 14 to be incorporated into the overall control system of system 10 without reconfiguration of system loads 12, energy supplies 14, and/or system 10. Since supply controller 40 may be designed to facilitate customization to individual energy supply 14, this distributed control design may enhance overall customization of system 10 to various uses and/or missions.

Figure 4:
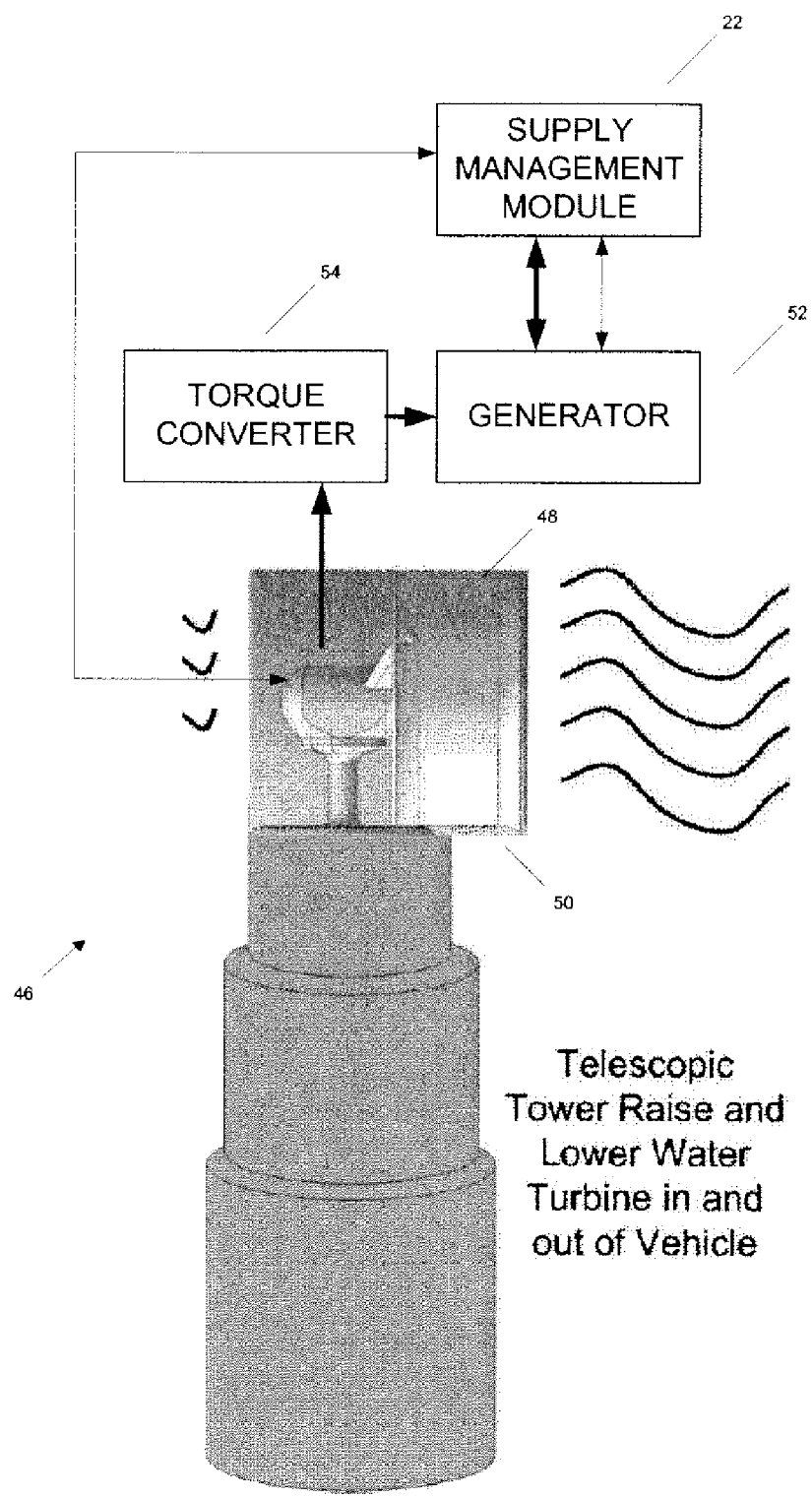
FIG. 4 illustrates a kinetic energy conversion system, according to one or more implementations of the invention.

FIG. 4 illustrates a kinetic energy conversion system 46, in accordance with one or more implementations. System 46 may be implemented in an overall system that is configured to power a vehicle or vessel and its associated peripherals (e.g., such as system 10 shown in FIG. 1 and described above). System 46 may be implemented, for example, in a maritime vessel. In some implementations, system 46 may include one or more flow paths 48, one or more impellers 50, a generator 52, and/or other components.

Flow path 48 may be configured to guide fluid past impeller 50. In some implementations, the fluid may include water in which the vessel carrying system 46 is sitting and/or moving. If the vessel is being driven through the water, flow path 48 may be oriented such that the water flows through flow path 48 past impeller 50. In some instances, flow path 48 may be carried on the vessel such that it can be retracted or closed off from the water. In such instances, flow path 48 may be retracted or closed off from the water while system 46 is not being used to generate power.

Impeller 50 may be configured such that a flow of fluid through flow path 48 drives impeller 50 to rotate. Although impeller 50 is illustrated in FIG. 4 as being held by an axle, this is not intended to be limiting. Other implementations of impellers may, for instance, be held by annular tracks around which (or within which) the impeller 50 rotates.

Generator 52 may be coupled to one or more of impellers 50. Rotation of impellers 50, for example by a flow of fluid through flow path 48, may result in the generation of power by generator 52.

In some implementations, impellers 50 may not be driven to rotate within flow path 48 at a constant rate. For example, the rate at which the fluid flows through flow path 48 may vary causing the rate of rotation of impellers 50 to vary. Coupling impellers 50 directly to generator 52 may result in damage to generator 52 and/or reduced efficiency in the power generation of generator 52 as the rate of impellers 50 changes. As such, in some instances, torque converters 54 may be included in system 46 between impellers 50 and generator 52. Torque converters 54 may provide for relatively constant rotation rate of one or more elements within generator 52, thereby enhancing the longevity, efficiency, and/or other aspects of the operation of generator 52.

As has been mentioned above, system 46 may be installed on a maritime vessel. In such a configuration, system 46 may be deployed by opening flow path 48 to the water through which the vessel is moving. This may result in a flow of water through flow path 48. The flow of water may cause impeller 50 to rotate, thereby enabling generator 52 to generate power. It should be appreciated that there may be some loss in aerodynamics associated with exposing flow path 48 to the water through which the vessel is moving. As such, generation of power in this manner may be somewhat parasitic to the overall vessel. However, the parasitic loss may be small enough and/or the benefits associated with generating power through generator 52 during movement may be sufficient to justify the inefficiencies. Further, at times when the parasitic loss of energy and/or speed becomes greater than can be justified, flow path 48 may be closed off and/or retracted from the water.

If the vessel including system 46 is at rest (e.g., anchored at a fixed point underwater), flow path 48 may be exposed to the water about the vessel. While the vessel is at rest, water may still flow through flow path 48 due to currents (e.g., tides, flow of rivers or creeks, and/or other currents). In these instances, system 46 may harvest environmental energy.

According to various implementations, system 46 may be implemented in a power system that is similar to or the same as the power system of system 10 shown in FIG. 1 and described above. As such, system 46 may interface with a supply management module 22 that has been configured control operation of flow path 48 (exposing flow path 48 to the water and/or closing flow path 48 from the water), impellers 50, generator 52, and/or other components of system 46. This control may be effected in the manner discussed above with respect to system 10.

Figure 5:
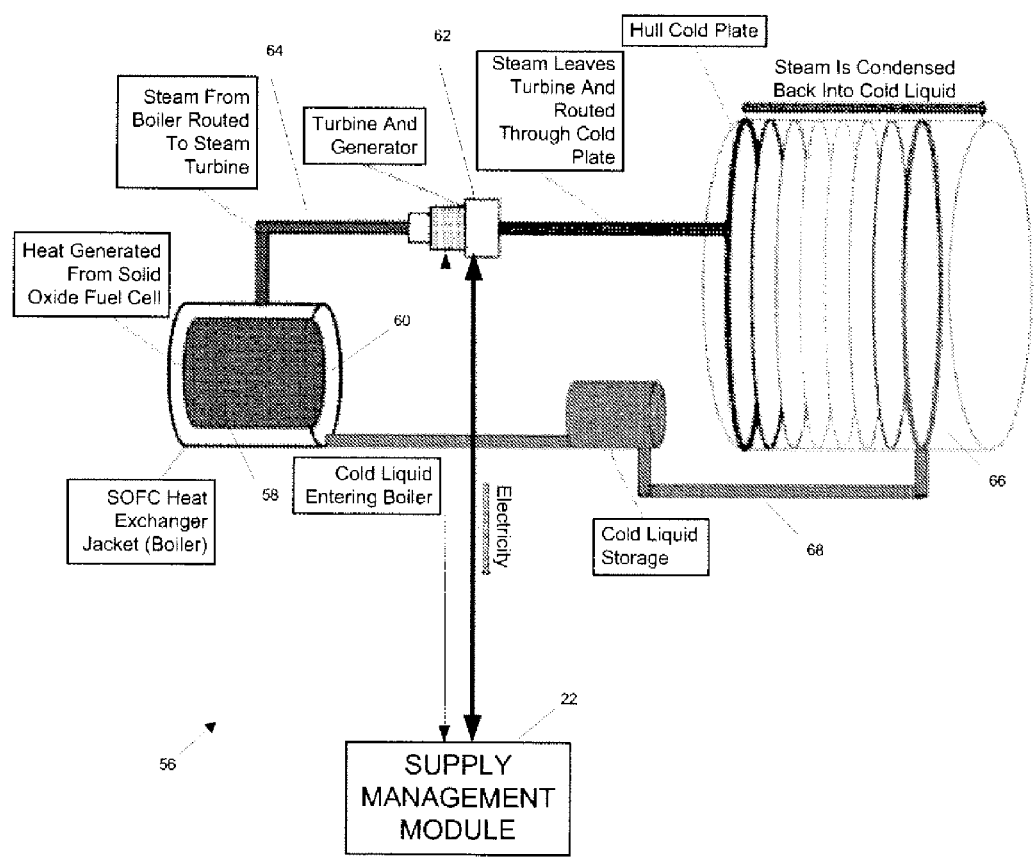
FIG. 5 illustrates a waste energy harvesting system, according to one or more implementations of the invention.

FIG. 5 illustrates a waste energy harvesting system 56, in accordance with one or more implementations. System 56 may be implemented in an overall system that is configured to power a vehicle or vessel and its associated peripherals (e.g., such as system 10 shown in FIG. 1 and described above). System 56 may be implemented, for example, in a maritime vessel. In some implementations, system 56 may include a fuel cell 58, a chamber 60, a steam generator 62, a first conduit 64, a cold plate 66, a second conduit 68, and/or other components.

Fuel cell 58 may include an electrochemical conversion device. The device may produce electricity from fuel and an oxidant, which react in the presence of an electrolyte. In some implementations, fuel cell 58 may include a solid oxide fuel cell. The operating temperature of fuel cell 58 may be relatively high. System 56 may be configured to harvest waste energy radiated from fuel cell 58 in the form of heat.

Chamber 60 may be formed around fuel cell 58. A fluid may be present within chamber 60. The fluid may be selected for having a critical temperature below the temperature within chamber 60 during operation of fuel cell 58. As such, the fluid will vaporize within chamber 60.

Steam generator 62 may be configured to generate power from the flow of fluid therethrough. For example, steam generator 62 may include one or more turbines that are driven by the flow of fluid therethrough. First conduit 64 may communicate chamber 60 with steam generator 62 such that fluid vaporized within chamber 60 is guided through steam generator 62.

Cold plate 66 may be configured to receive vapor that has passed through steam generator 62. Cold plate 66 may form a heat sink in which the received vapor is cooled back to below its critical temperature so that it returns to liquid form. Cold plate 66 may be formed as a body having one or more conduits therein that receive fluid that has passed through steam generator 62. In order to facilitate cooling of fluid within the conduits of cold plate 66, cold plate 66 may be in thermal communication with the hull of the vessel carrying system 56. For example, the body of cold plate 66 in which the one or more conduits are formed may be in direct contact with the hull of the vessel. In some implementations, the hull of the vessel itself may form cold plate 66, and have the conduits formed therein.

Second conduit 68 may receive the cooled fluid from cold plate 66, and may guide the cooled fluid back to chamber 60. Second conduit 68 may include one or more reservoirs configured to hold bodies of the fluid as the fluid progresses back toward chamber 60.

According to various implementations, system 56 may be implemented in a power system that is similar to or the same as the power system of system 10 shown in FIG. 1 and described above. As such, system 56 may interface with a supply management module 22 that has been configured control operation of generator 62 and/or the turbines associated with generator 62. In some instances, system 56 may include one or more valves to control the flow of the fluid through the circuit. In such instances, supply management module 22 may control the one or more valves. This control may be effected in the manner discussed above with respect to system 10.

As was mentioned above cold plate 66 may be formed in thermal communication with the hull of the vessel carrying system 56. In some implementations, cold plate 66 may be configured to increase the area over which the hull and cold plate 66 are in contact. For example, FIGS. 6-8 illustrate instances in which the shape of cold plate 66 has been configured to conform to the shape of a hull 70 of the vessel. This may increase the length of the path that fluid within cold plate 66 travels in thermal connection with hull 70 of the vessel and the water in which the vessel is at least partially submerged. Further, the conformance of the shape of cold plate 66 with hull 70 of the vessel may increase the effectiveness of the heat sink formed by cold plate 66 as cold plate 66 may be capable of dissipating an enhanced amount of heat to hull 70 and the water beyond.

Figure 9:
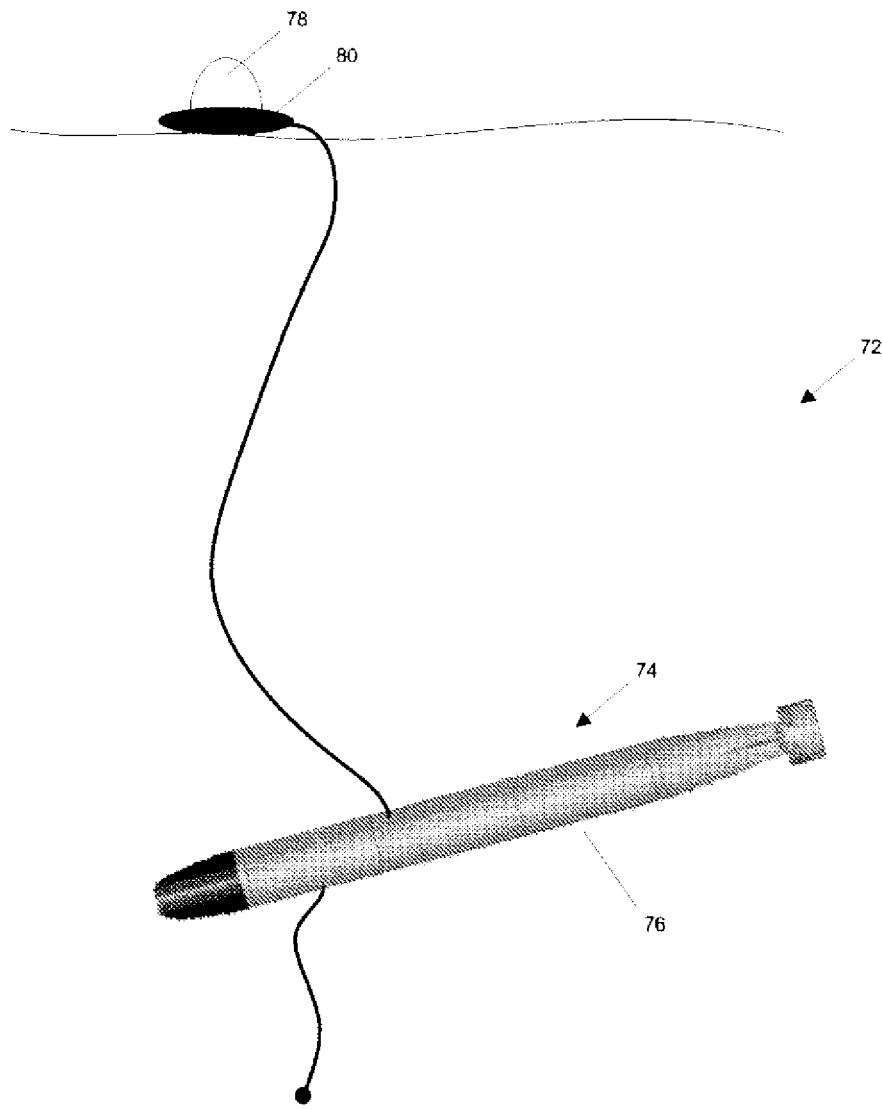
FIG. 9 illustrates an environmental energy harvesting system, in accordance with one or more implementations of the invention.

FIG. 9 illustrates an environmental energy harvesting system 72, in accordance with one or more implementations. System 72 may be implemented in an overall system that is configured to power an underwater vessel 74 and its associated peripherals (e.g., such as system 10 shown in FIG. 1 and described above). Vessel 74 may be an unmanned, underwater vessel, and may include a main hull 76. In some implementations, system 72 may include a sensor module 78, one or more solar cells 80, and/or other components.

In some instances, sensor module 78 may include one or more sensors configured to monitor one or more environmental parameters. The one or more environmental parameters may include a temperature, a current, a wind speed, an electromagnetic radiation intensity, an electromagnetic radiation frequency, radio frequency signals, sonic waves, and/or other environmental parameters.

Sensor module 78 may be buoyant such that it floats on water. During deployment of sensor module 78 for monitoring the one or more environmental parameters, main hull 76 may remain submerged under water. A tether 82 may couple sensor module 78 with main hull 76. In some instances, tether 82 may include one or more electrical connections that enable control signals, sensor output signals, power, and/or other signals to be transmitted between main hull 76 and/or sensor module 78.

The one or more solar cells 80 may, when sensor module 78 is deployed, generate power from electromagnetic radiation received from the sun. Some or all of the power generated from the received electromagnetic radiation may be implemented within sensor module 78 to power sensor module 78. Some or all of the power generated from the received electromagnetic radiation may be transmitted through tether 82 to main hull 76 for use in the main power system of underwater vessel 74. For example, the one or more solar cells 80 may form an energy supply that is the same as or similar to energy supplies 14 shown in FIG. 1 and described above.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A system configured to manage power within an unmanned underwater vessel, the system comprising:
   a power bus through which power is distributed to a plurality of system loads, the system loads comprising one or more of a sensor for detecting an environment parameter, a communications device, or a propulsion mechanism;
   a plurality of load management modules configured to control the system loads, the plurality of load management modules comprising a first load management module coupled to a first system load and a second load management module coupled to a second system load, wherein each of the first load management module and the second load management module is separately coupled to the power bus, and wherein each of the first load management module and the second load management module comprises:
- a power stage configured to condition the power received by the load management module from the power bus so that the received power can be used to power the corresponding system load;
- a power controller configured to control the power stage as power received by the power stage is conditioned for use by the corresponding system load, wherein the control of the power stage by the power controller includes feedback control based on operating parameters of the power stage; and
- a load controller configured to control the corresponding system load;

a system management processor in operative communication with the load management modules, the system management processor being configured to generate commands to the load controllers of the load management modules for controlling the system loads, the commands being determined based at least in part on mission parameters and one or more parameters of one or more energy supplies providing power to the system loads via the power bus.

2. The system of claim 1, wherein the one or more energy supplies providing power to the system loads comprises one or more of a fuel cell, an energy storage unit, a kinetic energy generator, a waste heat harvester, or a solar generator.

3. The system of claim 1, further comprising:
a plurality of supply management modules configured to control a plurality of energy supplies, the plurality of supply management modules comprising a first supply management module coupled to a first energy supply and a second supply management module coupled to a second energy supply, wherein each of the first supply management module and the second supply management module is separately coupled to the power bus, and wherein each of the first supply management module and the second supply management module comprises:
- a power stage configured to condition the power provided by the corresponding energy supply to the power bus so that the supplied power maintains one or more predetermined parameters;
- a power controller configured to control the power stage as power provided by the corresponding energy supply is conditioned by the power stage, wherein the control of the power stage by the power controller includes feedback control based on operating parameters of the power stage;
- a supply controller configured to control the corresponding energy supply; and wherein the system management processor is in operative communication with the supply management modules, the system management processor being further configured to generate commands to the supply controllers of the supply management modules for controlling the energy supplies to cooperate to maintain the potential of the power bus at a predetermined level, the commands being determined based at least in part on one or more parameters of the energy supplies providing power to the power bus.

4. The system of claim 3, wherein the one or more energy supplies providing power to the system loads comprises one or more of a fuel cell, an energy storage unit, a kinetic energy generator, a waste heat harvester, or a solar generator.

5. The system of claim 1, further comprising a user interface configured to receive mission parameters from a user, the user interface being operatively linked with the system management processor such that the received mission parameters are communicated from the user thereto.

* * * * *